June 5, 1923.

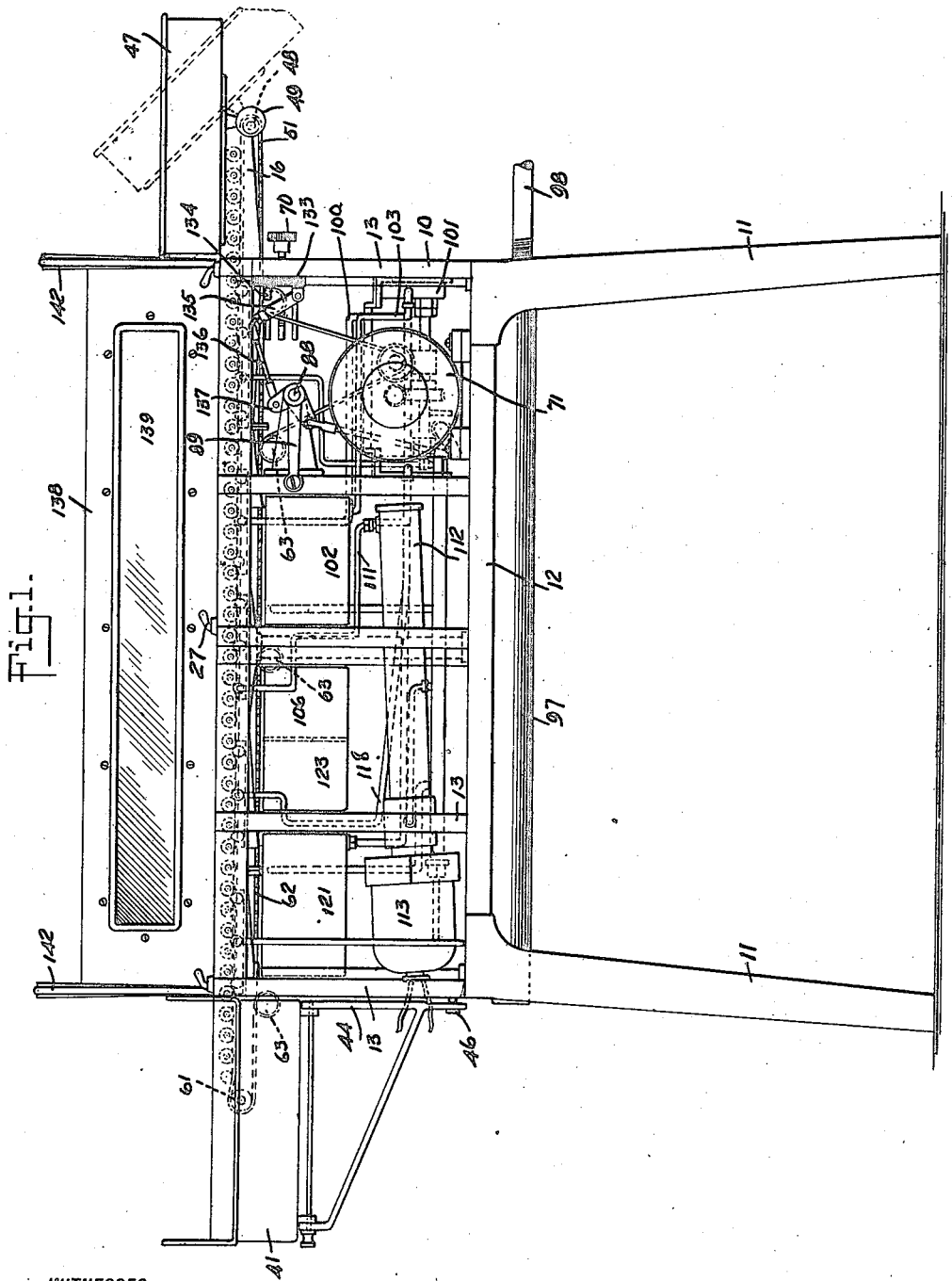

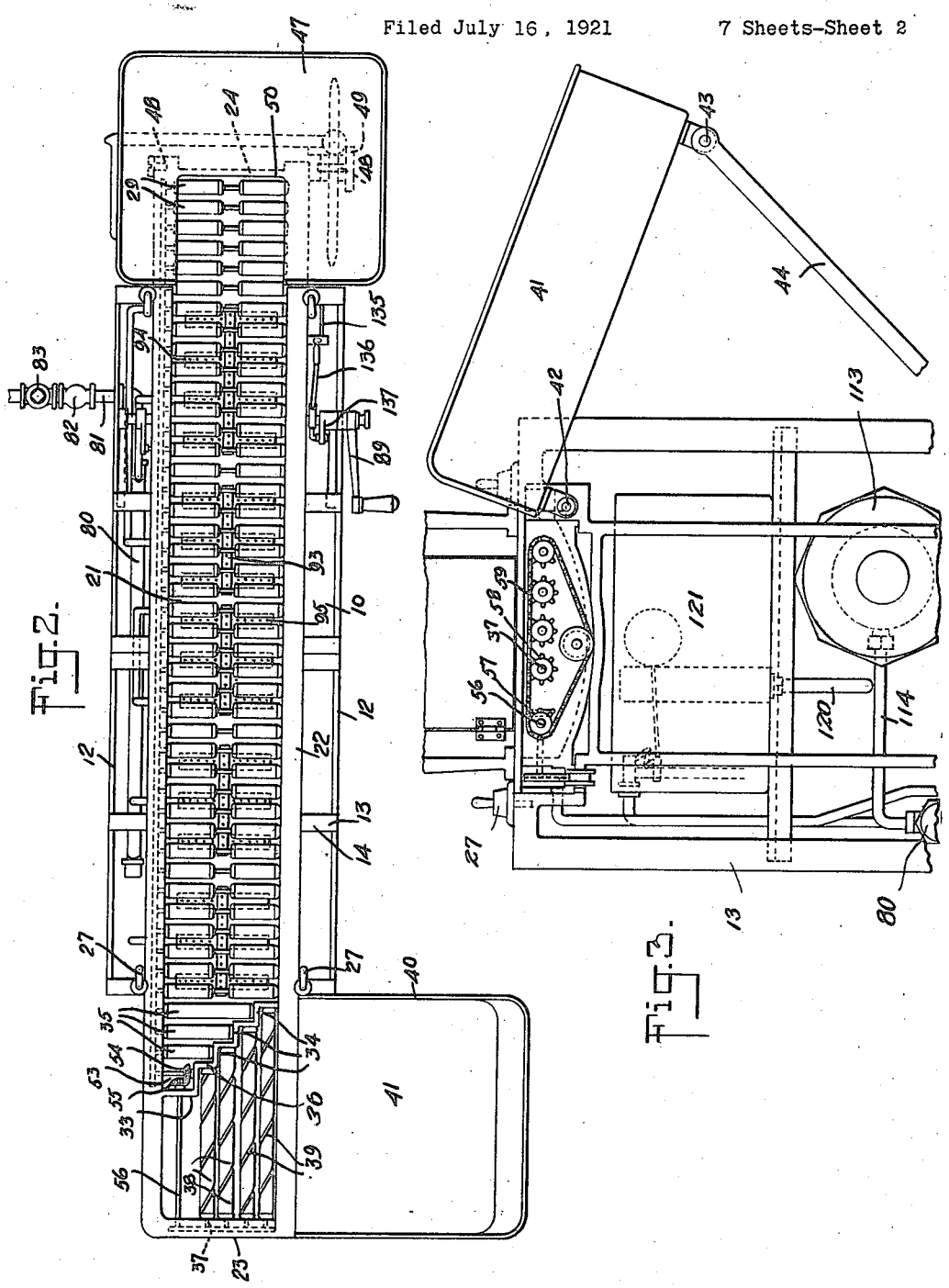

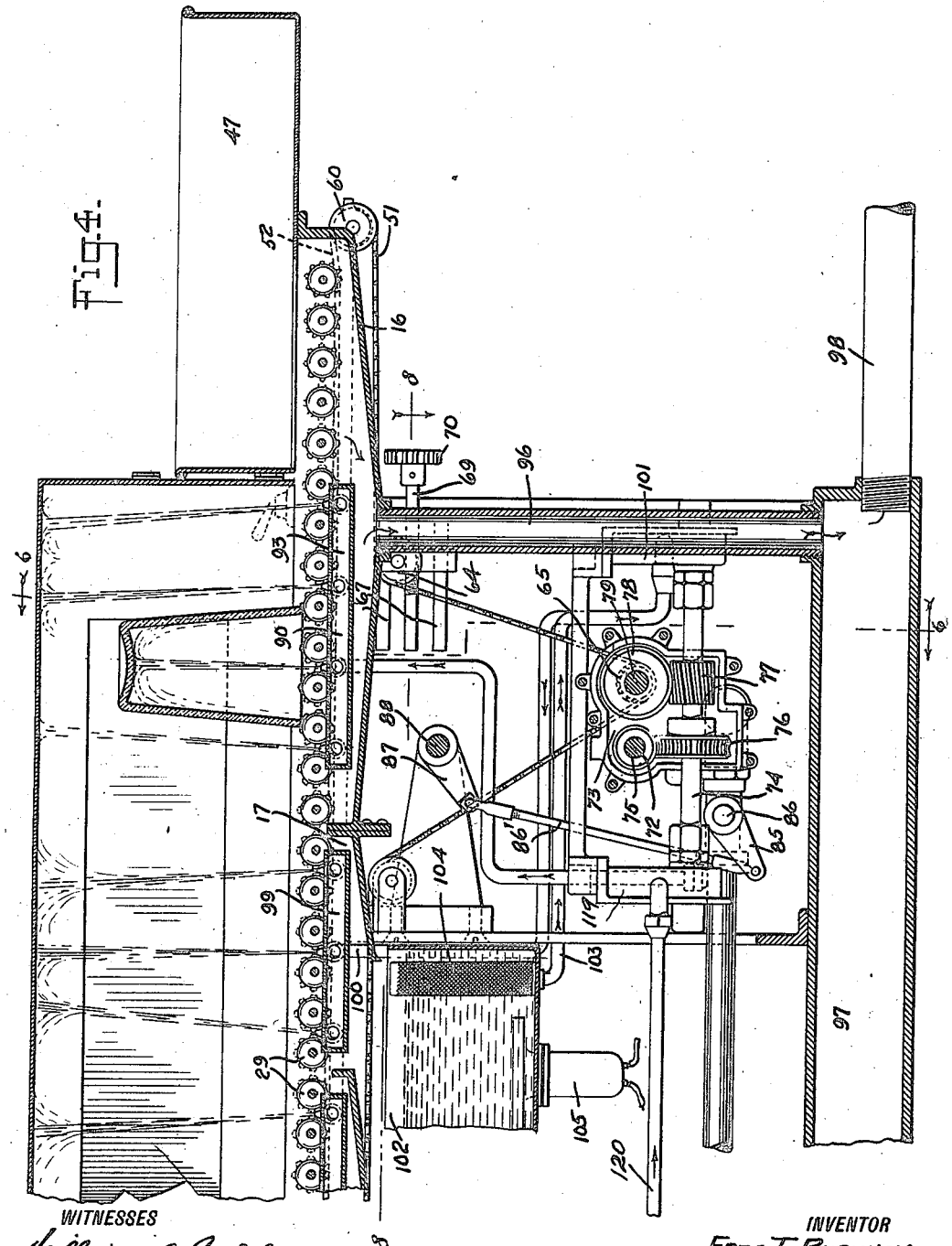

F. T. BURNHAM

GLASS WASHING MACHINE

Filed July 16, 1921

WITNESSES

INVENTOR
FRED T. BURNHAM
BY
ATTORNEYS

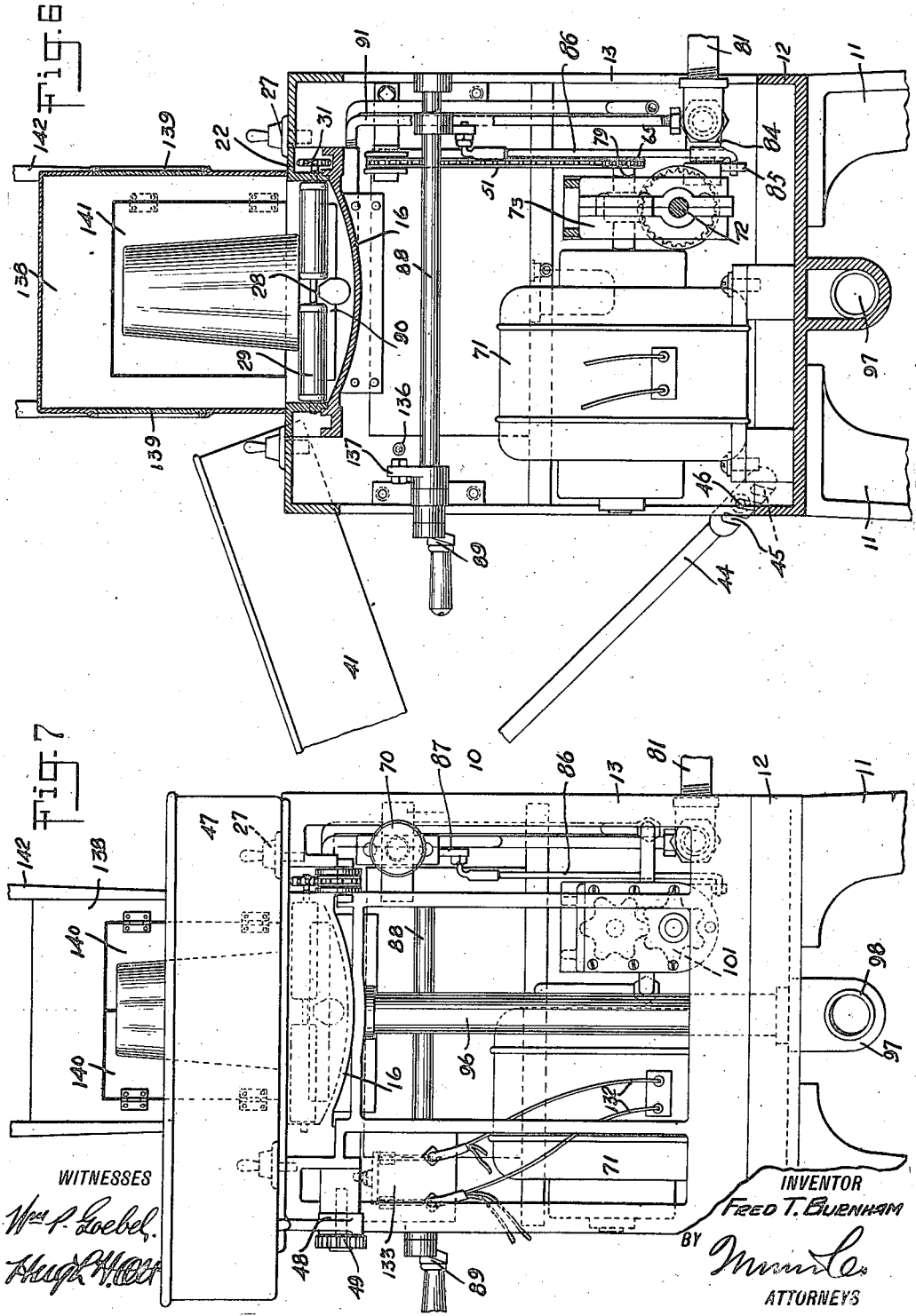

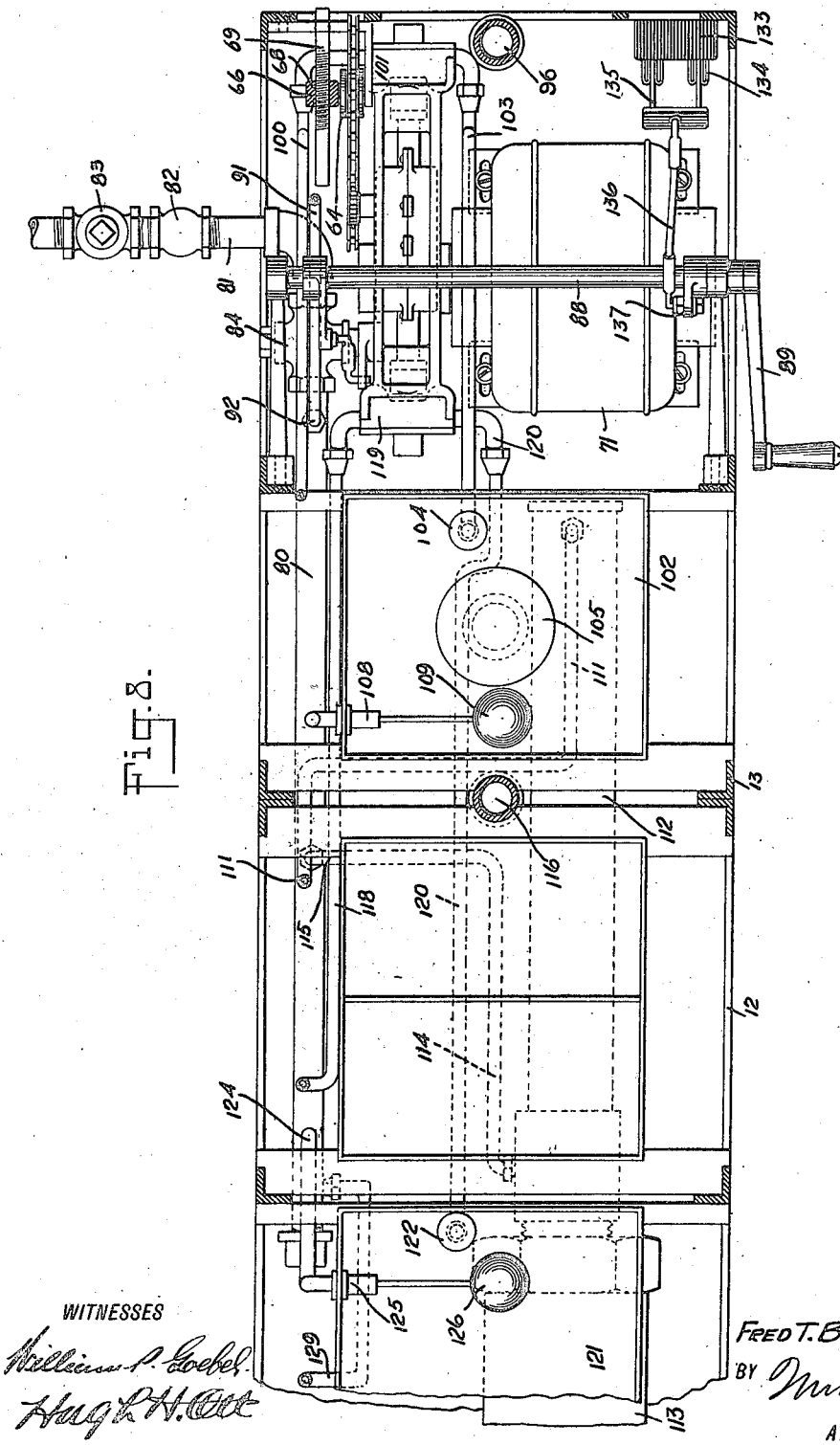

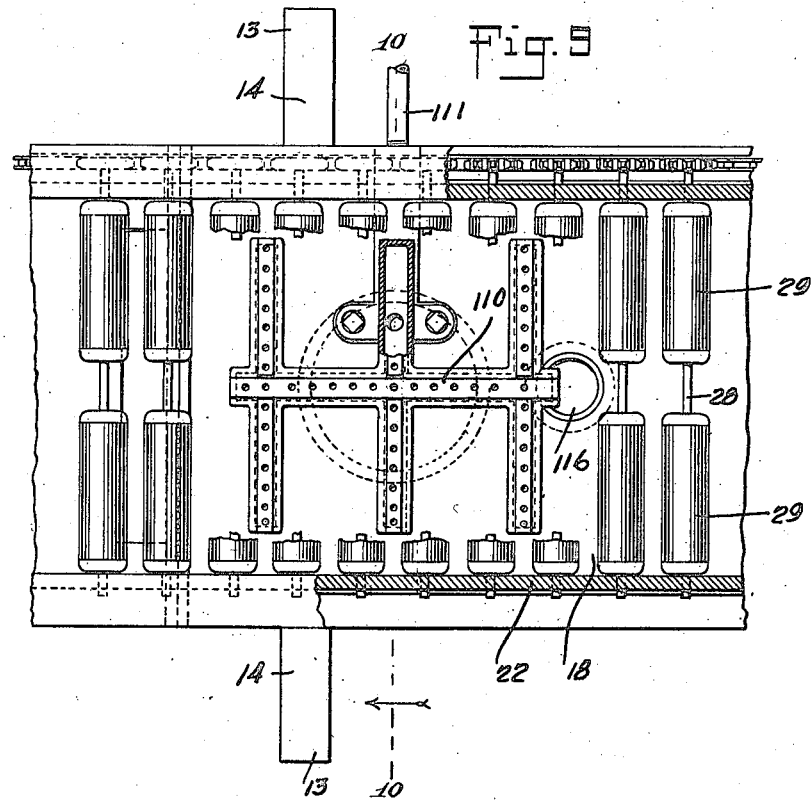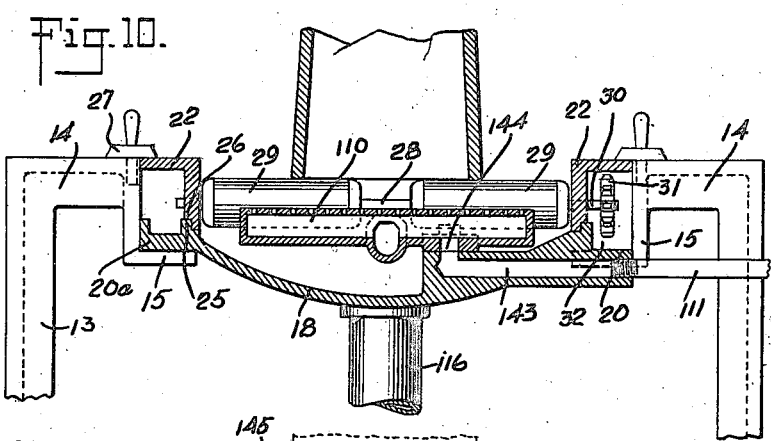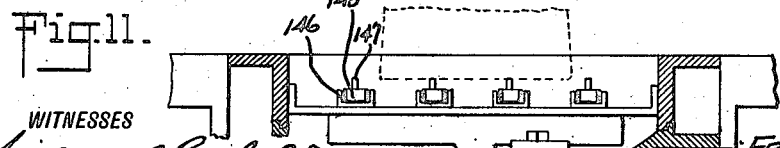

Patented June 5, 1923.

1,458,028

UNITED STATES PATENT OFFICE.

FRED T. BURNHAM, OF NEWTON CENTER, MASSACHUSETTS.

GLASS-WASHING MACHINE.

Application filed July 16, 1921. Serial No. 485,224.

*To all whom it may concern:*

Be it known that I, FRED T. BURNHAM, a citizen of the United States, and a resident of Newton Center, in the county of Middlesex and State of Massachusetts, have invented a new and Improved Glass-Washing Machine, of which the following is a full, clear, and exact description.

This invention has relation to washing machines and refers more particularly to a glass washing machine, the same being in the nature of an improvement over a somewhat similar machine covered by United States Letters Patent No. 1,215,107, granted on February 6, 1917.

The invention contemplates a comparatively simple, highly efficient and practical machine which is especially designed for expeditiously handling large quantities of glasses, cups, dishes, or other similar containers in soda fountains, public restaurants, or the like, to effect the thorough cleaning and sterilizing of the articles.

Some of the principal objects and advantages sought to be accomplished reside in the provision of a machine for the saving of time and labor ordinarily consumed in the washing of articles of this character; the provision of a machine which insures the consumer receiving his purchase in a clean and sanitary container free from dirt, germs, or other contagious matter; the provision of a machine which is self-contained and thoroughly efficient, and one which can be controlled by any person regardless of his knowledge of mechanical devices; the provision of a machine which is almost entirely automatic in its operation; the provision of a machine which may be readily disassembled for the purpose of cleaning and repairs; and the provision of a machine which includes a simple means of adjustment whereby lost motion due to wear and other causes may be readily compensated for.

Other objects and advantages will be more apparent as the nature, purpose and operation of the machine is better understood from the following specification, the appended claims and the accompanying drawing forming a part of this application, in which—

Figure 1 is a side elevation of a machine constructed in accordance with the invention.

Fig. 2 is a top plan view thereof, with the hood removed.

Fig. 3 is an enlarged fragmentary rear end view of the same.

Fig. 4 is an enlarged fragmentary longitudinal sectional view through the forward end of the machine.

Fig. 6 is a transverse sectional view through the machine taken approximately on the line 6—6 of Fig. 4.

Fig. 7 is an enlarged fragmentary front end view of the machine.

Fig. 8 is a fragmentary horizontal sectional view through the machine taken approximately on the line 8—8 of Fig. 4.

Fig. 9 is a fragmentary plan view with the hood removed, parts being broken away to disclose the underlying structure.

Fig. 10 is a fragmentary enlarged transverse sectional view taken approximately on the line 10—10 of Fig. 9.

Fig. 11 is a similar view of a modified form of the invention.

Figure 5:
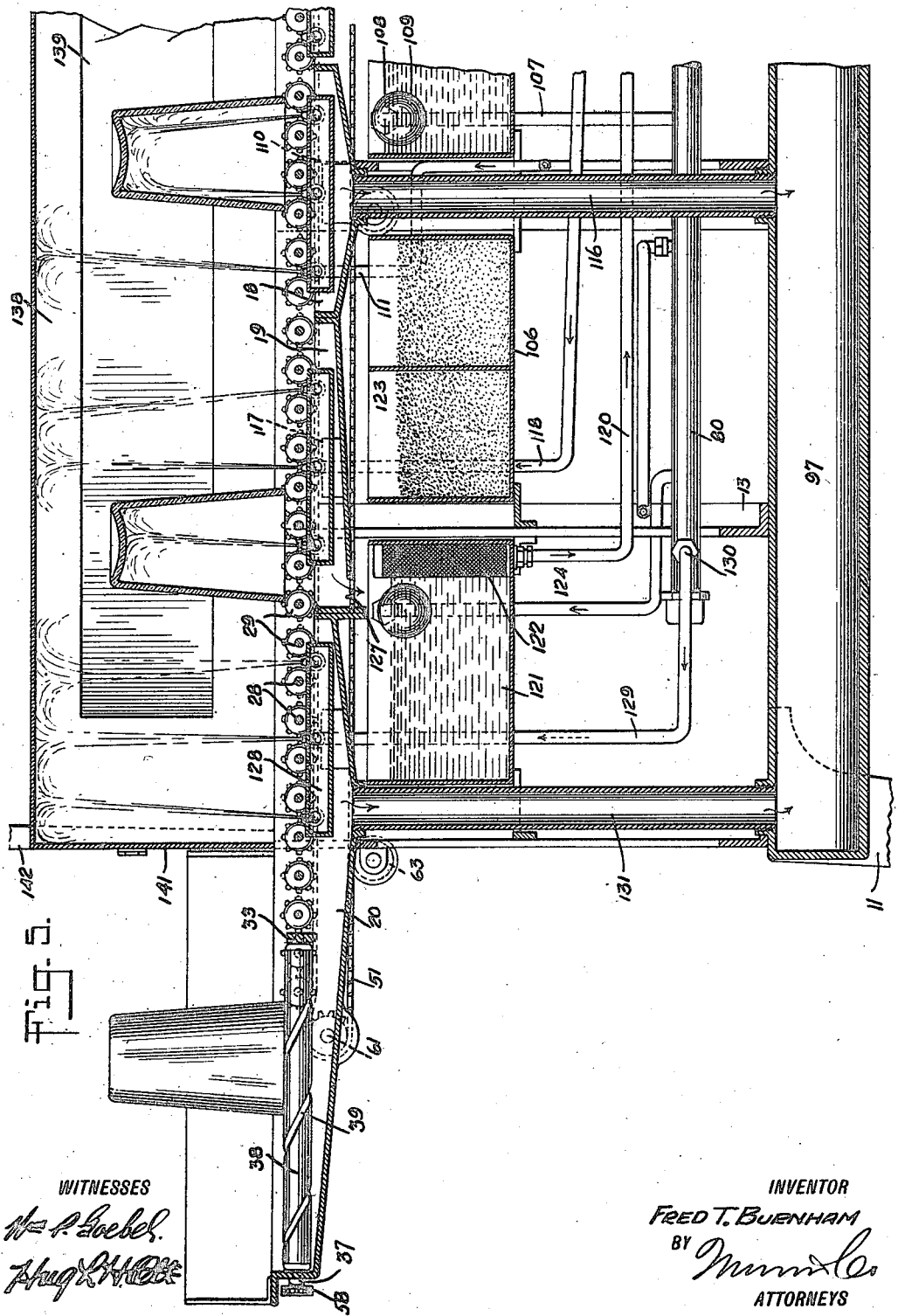
Fig. 5 is a similar view through the rear end of the same.

Referring to the drawings by characters of reference, 10 designates the body of the machine which is mounted on the supporting legs 11. The body consists of a framework which includes the bottom side rails 12 and the longitudinally spaced vertical side standards 13 having inwardly bent extremities as at 14 at their upper ends. L-shaped brackets 15 depend from the extremities 14 and constitute a line of longitudinally spaced supports for the drain pans 16, 17, 18, 19 and 20 which are secured together and set in place as a unit, the flanged side edges 20ª thereof resting on the brackets 15. The feed unit designated generally by the numeral 21 consists of a rectangular frame including side rails 22 of angle iron construction in cross section and end rails 23 and 24. The flanges 20ª of the drain pan unit are provided with an upstanding longitudinal bead 25 adjacent their juncture with the body of the pan. The lower edge of the vertical flange of the side rails 22 is rabbeted as at 26 to receive the beads 25 whereby the feeding unit is supported from the drain pan unit, the horizontal flange of the rails 22 being disposed flush with the upper surface of the extremities 14. Removable retaining elements 27 are carried by the extremities 14 and serve to engage and coact with the horizontal flange of the rails 22 to retain the feeding unit and drain pan unit in place. A plurality of parallel transversely disposed shafts 28 are mounted in the side rails 22 and each of said shafts have secured thereon a pair of feed rollers 29, the confronting inner ends of which are spaced apart for a purpose to be hereafter set forth. One extremity 30 of each shaft 28 has keyed or otherwise secured thereto a sprocket 31 which lies within the continuous space 32 defined by the extremities 14 of the standards 13, the brackets 15, the drain pan flanges 20ª, and the side rails 22. The rear end of the feeding unit extends beyond the rear end of the body of the machine and a stepped web 33 extends transversely thereof to provide a plurality of bearings 33 for one end of the gradually decreasing shafts 28 upon which single feed rollers 35 are mounted. The connecting portions 36 for the bearings 34 provide bearings for one end of the shafts 37 of right angularly disposed feed rollers 38 of gradually increasing length, the opposite ends of said shafts having bearing in the end rails 23. The feed rollers 38 are provided with spiral grooves 39 which are designed to coact with the glasses, to change the direction of the same as they move off of the feed rollers 35 on to the feed rollers 38, said spiral grooves also functioning to move the glasses laterally of the rollers whereby the same will be uniformly packed toward the front side edge 40 of the receiving tray 41 which is pivotally connected to the rear end of one of the side rails 22 of the feeding unit frame, as at 42. The receiving tray 41 has pivoted to the free outer end as at 43, a supporting rod 44 having a plurality of notches 45 engageable with a pin 46 carried by the frame of the body. This permits of various adjustments in the angularity of the receiving tray. The forward or inlet end of the feeding unit extends an appreciable distance beyond the forward end of the body of the machine and supports a feed tray 47 which is pivotally mounted thereon as at 48, a suitable set screw 49 being employed to retain the feed tray in its angularly adjusted positions.

The bottom of the feed tray 47 is cut away as at 50 to expose the foremost feed rollers 29 and permit of the shifting of the glasses or other articles in inverted position in the bottom of the tray on to the feed rollers. The feed rollers 29 are simultaneously driven in a direction to advance the glass from the inlet or forward end of the machine to the rear or discharge end by means of an endless sprocket chain 51, the upper lead 52 of which extends through the longitudinal space 32 and engages the teeth of the sprockets 31. The rearmost transverse shaft 53 is provided with a miter gear 54 in lieu of a feed roller and said miter gear meshes with a miter gear 55 on a right angularly disposed drive shaft 56. A sprocket 57 is keyed to the rear end of the drive shaft 56 and each of the shafts 37 are provided with sprockets 58 over which the upper lead of an endless chain 59 is trained. By this arrangement the rollers 39 are driven simultaneously and in the same direction and at the same rate of speed as the feed rollers 29. The sprocket chain 51 is trained over a guide roller 60 at the forward end of the machine and a guide roller 61 at the rear end of the machine, the lower lead 62 being trained over the idlers 63 and the tensioning idler 64 and thence around the drive sprocket 65. The tension idler 64 is mounted on an adjustable bearing block 66, which in turn is mounted on the guide bars 67 projecting rearwardly from the front end of the body. The bearing block is provided with a threaded opening 68 through which the threaded shaft 69 extends, said shaft being provided with a manipulating knob 70. By this arrangement slack in the sprocket chain 51 may be taken up to compensate for wear in the links of the chain. Preferably an electric motor 71 is employed for driving the machine and the motor shaft 72 thereof extends into a transmission housing 73 through which a shaft 74 extends at right angles to the motor shaft. The motor shaft is provided with a worm 75 which meshes with a worm gear 76 on the shaft 74 and a worm 77 secured on said shaft meshes with a worm gear 78 on a shaft 79 to which the drive sprocket 65 is keyed. The motor and transmission housing are mounted within the body of the machine adjacent its forward end. A water intake manifold 80 extends longitudinally through the body of the machine and the same is connected to an intake pipe 81 in which a water pressure regulator 82 and a water strainer 83 are provided. The forward end of the water intake manifold at its juncture with the intake pipe 81 has interposed therein a supply valve 84, which valve is controlled by an arm 85 connected with the valve stem 86 thereof. The arm 85 is connected by a connecting rod 86' to an arm 87 on the transverse shaft 88 which extends through the body of the machine and is provided at the projecting extremity thereof with an exteriorly disposed crank 89, a quarter turn of which in either direction serves to open or close the supply valve.

In their passage through the machine the glasses are initially subjected to a cold water rinse which is accomplished by means of a spray head 90 disposed within the drain pan 16 and arranged beneath the feed rollers 29. The spray head is connected by a pipe 91 directly with the water intake manifold 80 as at 92 to constantly supply water to the spray head while the supply valve 84 is open. The spray head consists of a centrally disposed longitudinally arranged pipe section 93 and laterally extending branch pipe sections 94 all of which are provided with spaced perforations 95 on their upper side. The longitudinal section is disposed in vertical alignment with the space between the inner ends of the rollers and the branch sections are disposed in vertical alignment with the space between the rollers of adjacent shafts 28. By this arrangement as the glass is conducted by the rollers over the spray head the water will enter the interior of the glass for rinsing the inside and will simultaneously subject the outer sides and bottom to a bath for rinsing the same of loose particles of foreign matter adhering thereto. The water will fall back into the drain pan 16 from whence it will be carried by the drain pipe 96 to the waste water manifold 97 connected with a pipe 98. The glass is next subjected to a cleaning bath consisting of a mixture of hot water and alkali or soap, or any other suitable cleaning solution which is applied to the glass by a spray head 99 of similar construction to the spray head 90. The spray head 99 is connected by a conduit pipe 100 to a rotary pump 101 driven by one extremity of the shaft 74. The pump 101 receives its supply of cleaning mixture from a tank 102 through the medium of a conduit pipe 103, said tank 102 being mounted in the body of the machine below the drain pan 17. The intake end of the pipe 103 is provided with a strainer 104 located in the tank 102. A suitable heater 105 preferably of the electric type is arranged within the tank for heating and maintaining the contents thereof at a predetermined temperature. The cleansing or washing solution in powdered form is contained in a bin 106 located adjacent the tank 102 and is designed to be supplied to the tank manually by the operator of the machine when needed. The water with which the cleaning or washing powder is mixed, is supplied to the tank 102 by a conduit pipe 107 and the supply is regulated by a valve 108 controlled by a float level regulator 109 which maintains the fluid in the tank at a predetermined level, replenishing the supply of water thereto when needed.

The drain pipe 17 which underlies the spray head 99 is designed to empty and discharge the washing solution directly into the tank 102, whereby the same washing solution may be used over again. The strainer 104 serves to separate and prevent solid particles from entering the supply pipe or conduit 103 which leads to the pump. The glass after passing through and having been subjected to a bath in the washing or cleansing fluid is next subjected to a hot water rinse through the medium of a spray head 110 of similar construction to the other spray heads and disposed within the drain pan 18 beneath the feed rollers 29. The hot water is supplied to the hot water spray head 110 through a conduit pipe 111 which receives its supply from an electrically heated drum 112 which drum is connected to and heated by an electric heater 113. The water is supplied to the heating drum by a pipe 114 which establishes communication between the drum and the water intake manifold at the point 115. The hot water employed for rinsing the glass falls back into the drain pan 18 from whence it is conveyed by a drain pipe 116 to the waste water manifold. The glass continuing its passage through the machine is next subjected to a bath in a sterilizing agent by means of a sterilizing spray head 117 of like construction to the former spray heads and located within the drain pan 19 beneath the conveying or feeding rollers 29. The sterilizing agent is supplied to the spray head 117 through a conduit pipe 118 which is connected with a rotary pump 119 operated by the opposite end of the shaft 74. The sterilizing agent is supplied to the pump 119 by means of a conduit pipe 120 which communicates with a sterilizing agent tank 121. The sterilizing agent preferably consists of a mixture of hypo-chlorite in liquid form with water. The liquid hypo-chlorite being arranged in a container bin 123 located adjacent the tank 121 is adapted to be manually supplied with the water in the tank by the operator of the machine. The water is supplied to the tank 121 through a conduit pipe 124 communicating with the water intake manifold 80. The supply to the tank is maintained at a predetermined level by a valve 125 on the outlet end of the pipe 124 which is controlled by a float 126. The sterilizing agent used to subject the glass to its bath therein, is returned to the tank 121 by means of the drain tray 19 which empties into the tank through a discharge port 127. The glass in its passage through the machine is finally subjected to a cold water rinse by a spray head 128 of similar construction to the other spray heads and located in the forward end of the rearmost drain tray 20 beneath the conveyor or feed roller 29. The cold water is supplied to the spray head 128 through the medium of the conduit pipe 129 which communicates with the water intake manifold at the point 130. The water from the spray head is caught by the drain pan 20 and conducted by a drain pipe 131 to the waste water manifold 97. The glass after being subjected to the final rinsing is conveyed by the rollers 29 on to the rollers 38 heretofore described. The drain pan 20 is of sufficient length to underlie the latter rollers 38 whereby the drippings therefrom will be carried off through the drain pipe 131.

The electric conduit wires 132 which control the motor are included in the circuit from a source of supply which also includes a switch 133 having stationary contacts 134 and a movable contact 135. The handle of the movable contact 135 is connected by a connecting rod 136 to an arm 137 mounted on the transverse shaft 88. The electric heaters 105 and 113 are also controlled by the switch 133. By this arrangement the movement of the crank arm 89 simultaneously opens the cold water supply valve 84 and closes the circuit to the motor 71 and the heaters 105 and 113, whereby the machine is thrown into operation. In order to provide means for housing the glasses during their subjection to the various baths and rinses, a hood 138 is employed which fits over the upper side of the body. The hood is provided with glazed windows 139 on its opposite sides whereby the operator may visualize the action of the machine to insure its proper operation. The forward end of the hood is provided with a pair of inwardly opening self-closing doors 140 which are adapted to be operated and opened by the glass as it is conveyed thereagainst by the feed rollers 29. The rear end of the hood is provided with a single outwardly opening and self-closing door 141 which is also operated to open position by the glass. The hood is provided at its opposite ends with upstanding handles 142 by which the same may be lifted from the machine when desired. As illustrated the spray heads are preferably secured to or form an integral part of the drain pans and the drain pans are provided with closed passages 143 which communicate with the inlet passage 144 of the spray head at one end and receiving the threaded extremity of the conduit pipes which supply the spray head.

Referring particularly to Fig. 11 of the drawings there has been illustrated a modified form of conveying means for conveying the glasses through the machine, said means consisting of a plurality of parallel endless chains 145 extending longitudinally through the machine in the channeled guides 146, said chains being provided with upstanding lugs 147 which engage within and coact with the glasses or other articles to be washed.

It will thus be seen that a comparatively simple and practical machine has been devised which will handle glasses, cups, saucers, or other dishes or containers for effecting the cleansing, washing, rinsing and sterilizing of the same in a very expeditious and efficient manner.

While there has been illustrated and described several preferred embodiments of the invention, no limitation is necessarily made to the precise structural details as it is to be understood that the right is reserved to embodiments other than those actually illustrated herein, to the full extent indicated by the general meaning of the terms in which the claims are expressed and by variations in the phraseology of the same.

I claim:

1. A washing machine of the character set forth including a plurality of upwardly directed spray heads, superposed means for conveying the articles to be washed thereover, a water supply means directly connected with the first and last spray heads for supplying and discharging water therefrom, independent means respectively connected with the water supply and with the second spray head and the next to the last spray head for respectively mixing, a cleansing and a sterilizing agent with the water received thereby to supply and discharge cleansing and sterilizing solutions from the second spray head and the next to the last spray head respectively, a means of connection between the water supply and the central spray head having a heating means interposed therein for supplying and discharging hot water from said central spray head, and means for receiving and conveying the waste water from the first, central and last spray head away from the machine.

2. A washing machine of the character set forth including a plurality of upwardly directed spray heads, superposed means for conveying the articles to be washed thereover, a water supply means directly connected with the first and last spray heads for supplying and discharging water therefrom, independent means respectively connected with the water supply and with the second spray head and the next to the last spray head for respectively mixing, a cleansing and a sterilizing agent with the water received thereby to supply and discharge cleansing and sterilizing solutions from the second spray head and the next to the last spray head respectively, a means of connection between the water supply and the central spray head having a heating means interposed therein for supplying and discharging hot water from said central spray head, means for receiving and conveying the waste water from the first, central and the last spray heads away from the machine, and means for respectively receiving and returning the discharge from the second spray head and the next to the last spray head to their respective mixing means.

3. A washing machine of the character set forth including a plurality of upwardly directed spray heads, superposed means for conveying the articles to be washed thereover, a cold water supply means having direct connection with the first and last spray heads for supplying and discharging cold water therefrom, independent means having respective connection with the water supply and with the second spray head and the next to the last spray head for respectively mixing, a cleansing agent and a sterilizing agent with the water received thereby to supply and discharge cleansing and sterilizing solutions from the second spray head and the next to the last spray head respectively, a means of connection between the water supply and the central spray head having a heating means interposed therein for supplying and discharging hot water from said central spray head, means for receiving and conveying the waste water from the first, central and last spray heads away from the machine, means for respectively receiving and returning the discharge from the second spray head and the next to the last spray head to their respective mixing means, and means for regulating the water supply to the mixing means for the second spray head and the next to the last spray head to maintain a predetermined level therein.

4. In a washing machine of the character set forth, a plurality of spray heads for directing the spray upwardly therefrom, superposed means for conveying the articles to be washed successively through the spray projecting from said spray heads, a water intake manifold adapted to be connected with a source of supply, a direct means of connection between the water intake manifold and the initial and final spray heads, a reservoir for the spray heads adjacent to the initial and final ones, a means of connection between the water intake manifold and each of said reservoirs, means for controlling the supply to said reservoirs from said connections whereby to maintain a predetermined level therein, said reservoirs respectively receiving cleansing and sterilizing agents for mixing with the water therein to produce cleansing and sterilizing solutions, means for heating the water supply of one reservoir, independent means of connection respectively between the reservoirs and their spray heads, means in said connections for withdrawing the contents of the reservoir therefrom and effecting the discharge of the same from their respective spray heads, a means of connection between the central spray head and the water intake manifold, means interposed in said connection for heating the water during its passage therethrough, means for receiving and conveying the waste water from the initial, central and final spray heads away from the machine, and means for receiving and returning the solutions discharged from the second spray head and the next to the last spray head back to their respective reservoirs.

5. In a washing machine of the character set forth, a plurality of longitudinally spaced spray heads for projecting the spray upwardly therefrom, means superposed with respect to the spray heads for conveying the articles to be washed through the spray therefrom, a common water supply means, a direct means of connection between the first spray head and the water supply for initially subjecting the articles to a cold water rinse, a reservoir for the second spray head, a means of connection between the water supply and said reservoir, means in said connection for maintaining the water in said reservoir at a predetermined level, said reservoir adapted to receive a cleansing agent to be mixed therewith, means for heating the mixture of the cleansing agent with the water in said reservoir, means for conducting and supplying the cleansing solution thus formed from the reservoir to the second spray head whereby to discharge the same therefrom and subject the article to a cleansing bath therein, a means of connection between the next spray head and the water supply, means interposed in said connection for heating the water received thereby during its passage therethrough whereby to subject the article to a hot water rinse from said spray head, a reservoir for the next spray head, a means of connection between the water supply and said reservoir, means in said connection for maintaining the water in said reservoir at a predetermined level, said reservoir adapted to receive a sterilizing agent to be mixed therewith, means for conducting and supplying the sterilizing solution thus formed from the reservoir to its spray head whereby to subject the article to a sterilizing bath, and a direct means of connection between the final spray head and the water supply for finally subjecting the articles to a cold water rinse.

6. In a washing machine of the character set forth, a plurality of longitudinally spaced spray heads for projecting the spray upwardly therefrom, means superposed with respect to the spray heads for conveying the articles to be washed through the spray therefrom, a common water supply means, a direct means of connection between the first spray head and the water supply for initially subjecting the articles to a cold water rinse, a reservoir for the second spray head, a means of connection between the water supply and said reservoir, means in said connection for maintaining the water in said reservoir at a predetermined level, said reservoir adapted to receive a cleansing agent to be mixed therewith, means for heating the mixture of the cleansing agent with the water in said reservoir, means for conducting and supplying the cleansing solution thus formed from the reservoir to the second spray head whereby to discharge the same therefrom and subject the article to a cleansing bath therein, a means of connection between the next spray head and the water supply, means interposed in said connection for heating the water received thereby during its passage therethrough whereby to subject the article to a hot water rinse from said spray head, a reservoir for the next spray head, a means of connection between the water supply and said reservoir, means in said connection for maintaining the water in said reservoir at a predetermined level, said reservoir adapted to receive a sterilizing agent to be mixed therewith, means for conducting and supplying the sterilizing solution thus formed from the reservoir to its spray head whereby to subject the article to a sterilizing bath, a direct means of connection between the final spray head and the water supply for finally subjecting the articles to a cold water rinse, a waste water manifold, means for receiving and conveying the discharge from the rinsing spray heads to said waste water manifold, and means for receiving and returning the discharge from the cleansing and sterilizing spray heads to their respective reservoirs.

7. A machine as characterized in claim 5 in which the conveying means is detachably associated with the machine to permit of its removal therefrom.

FRED T. BURNHAM